United States Patent

Nakayama et al.

[11] Patent Number: 5,129,979
[45] Date of Patent: Jul. 14, 1992

[54] DECORATIVE ARTICLE AND METHOD OF PRODUCING SAME

[75] Inventors: Tsuruo Nakayama, Soka; Fumiharu Kurokawa, Machida; Tomozo Sekiguchi; Takashi Yamaya, both of Soka, all of Japan

[73] Assignee: Pentel Kabushiki Kaisha, Tokyo, Japan

[21] Appl. No.: 628,998

[22] Filed: Dec. 18, 1990

Related U.S. Application Data

[63] Continuation of Ser. No. 347,963, filed as PCT/JP88/00591, Jun. 17, 1988, abandoned.

[30] Foreign Application Priority Data

Jun. 19, 1987 [JP] Japan ................. 62-152498
Mar. 31, 1988 [JP] Japan ................. 63-79643

[51] Int. Cl.$^5$ ............................................. B32B 31/00
[52] U.S. Cl. .................................. 156/294; 156/293; 156/309.6
[58] Field of Search ............ 156/293, 294, 182, 324.4, 156/309.6; 427/230

[56] References Cited

U.S. PATENT DOCUMENTS

| | | | |
|---|---|---|---|
| Re. 31,047 | 10/1982 | Ross | 428/36.2 |
| 2,171,118 | 8/1939 | Ball | 428/36.1 |
| 3,310,447 | 3/1967 | Matthews | 428/36.2 |
| 3,886,024 | 5/1975 | Chase | 156/294 |
| 3,945,867 | 3/1976 | Heller, Jr. et al. | 428/36.2 |
| 4,181,775 | 1/1980 | Corke | 428/348 |
| 4,282,905 | 8/1981 | Dopkin et al. | 156/74 |
| 4,347,090 | 8/1982 | Anderson et al. | 156/149 |
| 4,563,232 | 1/1986 | Peake | 156/182 |
| 4,601,928 | 5/1986 | Van der Velden | 156/294 |
| 4,734,305 | 3/1988 | Sugimoto et al. | 428/36.2 |
| 4,816,309 | 3/1989 | Hutt et al. | 428/34.9 |

FOREIGN PATENT DOCUMENTS

| | | | |
|---|---|---|---|
| 3431600 | 3/1986 | Fed. Rep. of Germany | 428/36.1 |
| 0840630 | 7/1960 | United Kingdom | |
| 1081417 | 8/1967 | United Kingdom | 428/36.1 |

Primary Examiner—Ellis P. Robinson
Assistant Examiner—Archene A. Turner
Attorney, Agent, or Firm—Wenderoth, Lind & Ponack

[57] ABSTRACT

A decorative article comprising a rod-like base and a seamless cylindrical fabric body covering the surface of the base in an integral form through an adhesive layer.

This decorative article can be produced by the following methods. a method which comprises applying a hot-melt adhesive onto the surface of a rod-like base, inserting the base into a seamless cylindrical fabric body, and press-bonding the fabric body with the base while heat-melting the adhesive, thereby adhering said fabric body to said base; a method which comprises inserting a rod-like base made of a thermoplastic resin into a seamless cylindrical fabric body and heat-pressing the surface of the fabric body to melt the surface of the base, thereby adhering the fabric body onto the base with the formed melt; or a method which comprises applying a hot-melt adhesive onto the surface of a rod-like base, inserting the base into a seamless heat-shrinkable fabric body, and shrinking the fabric body while heat-melting the adhesive through heat treatment, thereby adhering the fabric body to the base.

14 Claims, 1 Drawing Sheet

DECORATIVE ARTICLE AND METHOD OF PRODUCING SAME

This application is a continuation of now abandoned application, Ser. No. 07/347,963 filed as PCT/JP88/00591, Jun. 17, 1988, abandoned.

TECHNICAL FIELD OF THE INVENTION

The present invention relates to a decorative article formed by adhering a fabric onto the surface of a rod-like base and a method of producing the same.

BACKGROUND OF THE INVENTION

It is known in the art that the surface of a rod-like base, such as an axis barrel of a writing instrument is covered with a fabric body for the purpose of improving a decorative effect thereof. However, the conventional method is directed to the steps of winding a flat fabric body around the surface of a rod-like base and adhering the ends of the superposed fabric to each other. Therefore, a seam is formed, resulting in substantial difficulty in conducting pattern matching of the superposed fabric ends. This brought about problems such as a lowering in the decorative effect and occurrence of peeling of the fabric body at the seam.

SUMMARY OF THE INVENTION

An object of the present invention is to provide a decorative article free from the occurrence of peeling of a fabric body applied on the surface of a rod-like base for the purpose of improving a decorative effect and having no seam of the fabric.

Another object of the present invention is to provide a method of producing a decorative article of the kind as described above with high accuracy and efficiency.

Accordingly, the decorative article according to the present invention comprises a rod-like base and a seamless cylindrical fabric body covering the surface of said base in an integral form through an adhesive layer.

One embodiment of the method of producing a decorative article according to the present invention comprises applying a hot-melt adhesive on the surface of a rod-like base, inserting said base into a seamless cylindrical fabric body, and press-bonding said fabric body with said base while heat melting said adhesive, thereby adhering said fabric body onto said base.

Another embodiment of the method of producing a decorative article according to the present invention comprises inserting a rod-like base made of a thermoplastic resin into a seamless cylindrical fabric body, and heat-pressing the surface of said fabric body to melt the surface of said base, thereby adhering said fabric body onto said base with the formed melt.

A further embodiment of the method of producing a decorative article according to the present invention comprises applying a hot-melt adhesive onto the surface of a rod-like base, inserting said base into a seamless heat-shrinkable fabric body, and shrinking said fabric body while heat-melting said adhesive through heat treatment, thereby adhering said fabric body onto said base.

PREFERRED EMBODIMENTS OF THE INVENTION

The present invention will now be described in more detail with reference to the accompanying drawings.

Figure 1:
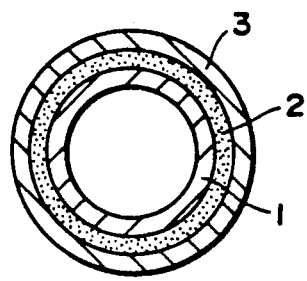
FIG. 1 is a cross-sectional view of the decorative article embodying the present invention.
Figure 2:
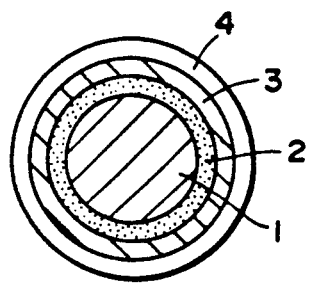
FIGS. 2 and 3 are cross-sectional views of the decorative article according to other embodiments of the present invention.
Figure 3:
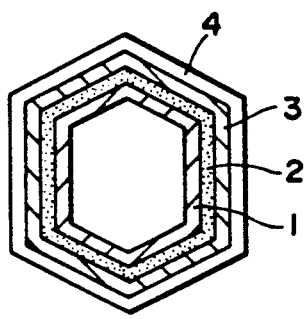

In FIGS. 1 to 3 a base 1 is prepared by molding a metal, such as iron, copper, aluminum, zinc or an alloy thereof, ceramic, glass, or a resin into a rod. If necessary, the surface of the base 1 may be coated with a coating layer through known electroplating, electroless plating, or the like or subjected to chemical conversion treatment, coating, screen printing, or the like.

The terms "rod" and "rod-like" base used herein are intended to mean not only a hollow body shown in FIGS. 1 and 3 but also a solid body shown in FIG. 2. The profile thereof is not necessarily circular as shown in FIGS. 1 and 2 but may be in the form of an oval, a polygon, or the like (see FIG. 3). Further, the rod-like base may be tapered in a longitudinal direction thereof.

Examples of the adhesive layer 2 provided on the surface of the rod-like base 1 include the following two types of adhesive layers used depending upon the characteristics of the base.

The first type of the adhesive layer is one used in the case where the base comprises a material relatively less susceptible to thermal change, e.g., the above-described metal or ceramic. In this case, a solvent or solvent free type hot-melt adhesive layer is used as the adhesive layer. The other type of the adhesive layer is one used in the case where the base material comprises a material susceptible to thermal change including a thermoplastic resin. In this case, a melt layer formed by heat-melting the surface of the base is used as the adhesive layer.

The above-described hot-melt adhesive should have a melting point below the softening point of the base, and a curing agent can be incorporated therein.

The fabric body 3 covering the surface of the adhesive layer 2 is one prepared by forming a seamless cylindrical fabric body through the use of at least one member selected from among natural fibers such as cotton, hemp and silk, inorganic fibers such as carbon and glass fibers, metallic fibers such as stainlesss steel, copper, nickel and iron fibers, chemical fibers such as cellulose, polyamide, polyvinyl alcohol, polyvinylidene chloride, polyvinyl chloride, polyester, polyacrylonitrile, polyethylene, polypropylene, polyurethane, polyalkylene p-hydroxybenzoate, phenolic and polyfluoroethylene fibers, etc.

The fabric body can be prepared so as to have a surface in various forms through proper selection of the material for the fiber and the state of the fiber, such as finished yarn, filament, and spun yarn.

The fabric body 3 may be one consisting of a heat-shrinkable fiber, specifically Teviron (a product of Teijin Limited, a corporation of Japan) alone or in combination with a heat-nonshrinkable fiber. When the heat-shrinkable fabric body is used, the fabric material per se is shrunk when heated, and closely adhered to the base, which makes it possible to use it for another type of a base having a relatively uneven external shape (e.g., a base tapered in a longitudinal direction thereof).

Since the fabric body 3 adhered to the surface of the base does not produce any loosening in a longitudinal direction at the ends thereof it is possible to fuse the ends of a fabric body made of a chemical fiber through heating or to sandwich the ends of the fabric body between a base and a mounting member. Further, a coating layer 4 such as a known clear coating, e.g., an acrylic, melamine, urethane, fluorocarbon or silicone coating, or a transparent film thermosetting acrylic, melamine, urethane, fluorocarbon or silicone coating (see FIGS. 2 and 3) may be formed on the fabric body 3 for the purpose of mainly preventing the surface of the fabric body from staining.

A proper selection of the thickness of the adhesive layer or fabric body enables the decorative article to be produced so as to have a surface in various forms.

The method of producing a decorative article according to the present invention will now be described.

The decorative article according to the present invention can be produced by any of the three following methods.

The first method comprises applying a hot-melt adhesive onto the surface of a rod-like base by means of spray or a roll coater, drying said hot-melt adhesive, inserting the base into a seamless cylindrical fabric body, and heating the resultant laminated rod to melt the adhesive while applying a pressure to the laminated rod with a hot plate, a hot roller, or the like; or inserting the base covered with the fabric body into a heat-resistant hollow rubber body and subjecting the resultant laminated rod to hot press treatment, i.e., heat-pressing the external surface of the hollow body to melt the adhesive, thereby integrating the base with the fabric body.

In this method, an adhesive layer having an even thickness may be formed on the surface of a base, and preliminary bonding may be conducted prior to the heat-pressing treatment in order to prevent a local lowering in the adhesion and occurrence of creases of the fabric caused by the unevenness of the adhesive layer provided on the surface of the base. The preliminary bonding can be conducted by a method wherein the adhesive layer is melted so as to have an even thickness by heating, thereby temporarily adhering the fabric body onto the surface of the base, or a method wherein, as with the above-described case, the base covered with a fabric body is inserted into a heat-resistant hollow rubber body and the resultant laminated rod is subjected to hot press treatment, i.e., heat-pressed for bonding.

The second method according to the present invention is applied to the case where a material susceptible to thermal change including a thermoplastic resin is used as the base, and comprises inserting a rod-like base made of a thermoplastic resin, such as an acrylonitrile-butadiene-styrene copolymer, an acrylonitrile-styrene copolymer, polypropylene, polyethylene, polycarbonate, polyvinyl chloride, nylon, polybutyl terephthalate, urethane, acrylic or polyethylene terephthalate, into a seamless cylindrical fabric body (having a higher melting point than that of the base), heating the resultant laminated rod with a hot plate, a hot roller, or the like to melt the surface of the base, and pressure-welding the base to the fabric body with the melt. In this method, since no adhesive is required, it is possible to simplify the operation and to reduce the cost.

The third method according to the present invention is applied to the case where a heat-shrinkable fabric body is used as the fabric body, and comprises applying a hot-melt adhesive onto the surface of a rod-like base with a spray, a roll coater, or the like, drying the adhesive, inserting the base into a seamless, cylindrical, heat-shrinkable fabric body, and heat-treating the resultant laminated rod to melt the adhesive and, at the same time, to heat-shrink the fabric body, thereby integrating the base with the fabric body. In this method, since the fabric body is adhered to the base by heat shrinkage of the fabric body per se, the melting of the adhesive and the adhesion of the fabric body onto the base can be advantageously accomplished simply by placing the laminated rod in heating atmosphere without necessity of applying a pressure to the fabric body from the surface thereof.

The present invention will now be described in more detail with reference to the following Examples.

EXAMPLE 1

Cylindrical brass formed by press working and having a diameter of 8.8 mm, a length of 100 mm, and a thickness of 0.3 mm was used as a base, and the surface of the base was degreased and washed with trichlene. A hot-melt adhesive prepared by adding 5% of Coronate L (an isocyanate curing agent; a product of Nippon Polyurethane Kabushiki Kaisha, a corporation of Japan) to PES-360SK (a product of Toa Gosei Kabushiki Kaisha, a corporation of Japan) and adjusting the solid content of the mixture to 15% with methyl ethyl ketone was sprayed on the surface of the base so as to form a layer having a thickness of 10 $\mu$m and dried at 80° C. for 2 min.

The above-described base was inserted into a fabric body in the form of a cylinder having substantially the same diameter as that of the above-described base and prepared by tension weaving of a finished yarn comprising a colored polyester having a yarn diameter of 100 denier, and the resultant laminated cylinder was subjected to press-bonding with a hot plate heated at 200° C. under a pressure of 5 Kg/cm$^2$.

Thus, the fabric body was adhered to the base, and the ends of the fabric body in the longitudinal direction thereof were then heated to 260° C. for heat welding.

EXAMPLE 2

Cylindrical brass formed by press working and having a diameter of 8.8 mm, a length of 100 mm, and a thickness of 0.3 mm was used as a base, and the surface of the base was degreased and washed with trichlene. A hot-melt adhesive prepared by adding 5% of Coronate L (an isocyanate curing agent; a product of Nippon Polyurethane K. K.) to PES-360SK (a product of Toa Gosei K. K.) and adjusting the solid content of the mixture to 15% with methyl ethyl ketone was sprayed on the surface of the base so as to form a layer having a thickness of 10 $\mu$m and dried at 80° C. for 2 min.

The above-described base was inserted into a fabric body in the form of a cylinder having substantially the same diameter as that of the above-described base and prepared by tension weaving of a finished yarn comprising a colored polyester having a yarn diameter of 100 denier, and then inserted into a hollow body made of a silicone rubber and having a diameter of 10 mm, a length of 120 mm and a thickness of 10 mm. The resultant laminated cylinder was hot pressed at 180° C. under a pressure of 10 Kg/cm$^2$ for 10 sec, thereby press bonding the fabric body to the base.

Thus, the fabric body was adhered onto the base, and the ends of the fabric body in the longitudinal direction were then heated to 260° C. for heat welding.

EXAMPLE 3

The surface of cylindrical brass prepared in the same manner as that of Example I was degreased and washed with trichlene. Unipal (a white acrylic paint; a product of Ohashi Kagaku Kabushiki Kaisha, a corporation of Japan) was sprayed on the surface of the brass so as to form a white coating layer and dried at 160° C. for 15 min. to prepare a base.

Subsequently, S-20 (a product of Toa Gosei K. K.) was applied as a hot-melt adhesive onto the surface of the base so as to form a layer having a thickness of 15 μm and dried at 160° C. for 5 min.

The above-described base was inserted into a fabric body in a mesh form having substantially the same diameter as that of the above-described base and prepared by tension weaving of a filament comprising a colored polyester having a filament diameter of 165 denier, and the resultant laminated cylinder was subjected to press bonding with a hot plate heated at 200° C. under a pressure of 5 Kg/cm$^2$.

Thus, the fabric body was adhered to the base, and an acrylic clear coating was applied onto the fabric body, dried at 180° C. for 30 min., and subjected to surface polishing.

EXAMPLE 4

Brass in the form of a regular hexagonal cylinder prepared by press working and having a diameter of 8.8 mm, a length of 100 mm, and a thickness of 0.3 mm was used as a base, and the surface of the base was degreased and washed with trichlene. Unipal (a black acrylic paint; a product of Ohashi Kagaku K. K.) was sprayed on the surface of the brass so as to form a black coating layer and dried at 160° C. for 15 min. to prepare a base.

Subsequently, S-20 (a product of Toa Gosei K. K.) was sprayed as a hot-melt adhesive on the surface of the base so as to form a layer having a thickness of 15 μm and dried at 160° C. for 5 min.

The above-described base was inserted into a cylindrical fabric body prepared by forming a 1 μm thick nickel coating on a metallic fiber comprising stainless steel and having a yarn diameter of 0.1 mm by electroless nickel plating, further forming a 0.5 μm-thick gold coating thereon by electroless gold plating, and tension weaving the stainless steel fiber into a cylinder form, and the resultant laminated cylinder was subjected to press-bonding with a hot plate heated at 200° C. under a pressure of 5 Kg/cm$^2$.

Thus, the fabric body was adhered onto the base.

EXAMPLE 5

A hot-melt adhesive was applied onto the surface of a base and dried in the same manner as that of Example 1. Thereafter, the base was inserted into a fabric body in the form of a cylinder having substantially the same diameter as that of the base and prepared by torsion weaving of a finished yarn comprising a colored polyester having a yarn diameter of 60 denier, and the resultant laminated cylinder was allowed to stand in an atmosphere of 150° C. for 5 min. for preliminary bonding. Thereafter, press-bonding was conducted with a hot plate heated at 170° C. under a pressure of 5 Kg/cm$^2$.

EXAMPLE 6

A base inserted into a cylindrical fabric body in the same manner as that of Example 5 was inserted into a hollow silicone rubber body having a diameter of 10 mm, a length of 120 mm, and a thickness of 10 mm, and the resultant laminated cylinder was press worked at 180° C. under a presssure of 10 Kg/cm$^2$ for 5 sec. for preliminary bonding. Thereafter, press-bonding was conducted with a hot plate heated at 200° C. under a pressure of 5 Kg/cm$^2$.

EXAMPLE 7

A base inserted into a cylindrical fabric body in the same manner as that of Example 5 was allowed to stand in an atmosphere of 150° C. for 5 min. and inserted into a hollow silicone rubber body having a diameter of 10 mm, a length of 120 mm, and a thickness of 10 mm, and the resultant laminated cylinder was press worked at 180° C. under a pressure of 10 Kg/cm$^2$ for 5 sec. for preliminary bonding. Thereafter, press-bonding was conducted with a hot plate heated at 200° C. under a pressure of 5 Kg/cm$^2$.

EXAMPLE 8

An acrylonitrile-butadiene-styrene copolymer resin molding (an outer diameter of 8.0 mm, an inner diameter of 6.0 mm, and a length of 10 mm) was used as a base, and the base was inserted into a fabric body in the form of a cylinder having substantially the same diameter as that of the base and prepared by torsion weaving of a cotton having a yarn diameter of 80 denier and then inserted into a hollow silicone rubber body having a diameter of 10 mm, a length of 120 mm, and a thickness of 10 mm. The resultant laminated cylinder was press worked at 120° to 130° C. under a pressure of 6 Kg/cm$^2$ for 5 sec. to melt the surface of the base comprising an acrylonitrile-butadiene-styrene copolymer resin, thereby adhering the fabric body onto the base.

EXAMPLE 9

A regular hexagonal polyethlene resin molding having a diameter of 3 mm, a length of 100 mm, and a side length of 4 mm was used as a base, and the base was inserted into a fabric body in the form of a cylinder having substantially the same diameter as that of the base and prepared by torsion weaving of a polyester having a yarn diameter of 40 denier. Thereafter, the surface of the polyethylene resin as the base was melted in the same manner as that of Example 8, thereby adhering the fabric body onto the base.

EXAMPLE 10

Brass was press worked so as to have such a shape that the outer diameter of a larger-diameter portion, the outer diameter of a smaller-diameter portion, and the length were 10 mm, 5 mm, and 70 mm, respectively, and the larger-diameter portion was connected to the smaller diameter portion with a given radius of curvature. The brass was degreased and washed with trichlene. Unipal (a black acrylic paint; a product of Ohashi Kagaku K. K.) was applied onto the brass so as to form a black coating layer and dried at 160° C. for 20 min. to prepare a base.

Subsequently, PES-360SK (a product of Toa Gosei K. K.) was sprayed as a hot-melt adhesive on the surface of the base so as to form a layer having a thickness of 5 μm and dried at room temperature.

The above-described base was inserted into a fabric body in the form of a cylinder prepared by torsion weaving of Teviron, i.e., a heat shrinkable fiber in the form of a black filament having a filament diameter of 100 denier (a product of Teijin Limited) and allowed to stand in a drying atmosphere of 120° C. for 10 min. to shrink the fabric body, thereby adhering the fabric body onto the surface of the base.

EXAMPLE 11

Aluminum was press worked so as to have such a shape that the outer diameter of a larger-diameter portion, the outer diameter of a smaller-diameter portion, and the length were 10 mm, 5 mm, and 70 mm, respectively, and the larger-diameter portion was connected to the smaller-diameter portion with a given radius of curvature. A 10 μm-thick anodized aluminum sulfate coating was formed on the surface of tha aluminum by anodization, and the coated aluminum was dyed gray to prepare a base.

A hot melt adhesive prepared by adding 3% by weight of Cornate L (an isocyanate curing agent; a porduct of Nippon Polyruethane K. K.) to PES-360SK (a product of Toa Gosei K. K.) was sprayed on the surface of the base so as to form a layer having a thickness of 5 μm and air dried.

The above-described base was inserted into a cylindrical fabric body formed by torsion weaving of a combination of Teviron (III), i.e., a heat-shrinkable fiber in the form of a gray filament having a filament diameter of 100 denier (a product of Teijin limited) with Teijin Tetoron, i.e., a polyester fiber in the form of a gray spun yarn having a yarn diameter of 100 denier and allowed to stand in a drying atmosphere of 120° C. for 10 min. to shrink the fabric body, thereby adhering the fabric body onto the surface of the base.

All of the samples prepared in Examples 1 to 11 were free from unevennesses on the surface of the fabric body adhered onto the base, i.e., had a smooth coated surface, and were excellent in long-term adhesion.

What is claimed is:

1. A method of producing a decorative article, comprising the steps of applying a mixture of a hot-melt adhesive with a solvent on the surface of a rod base, heating the mixture to evaporate the solvent and dry the hot-melt adhesive, inserting said base provided on the outer surface thereof with the dried hot-melt adhesive into a seamless cylindrical body to said base by preliminarily heating said adhesive until it melts and attains an even thickness to temporarily adhere said decorative fabric body onto the outer surface of said base, and press-bonding said fabric body onto said base while heat-melting said adhesive by applying pressure and heat against the outer surface of said fabric body, thereby adhering said decorative fabric body onto said base.

2. The method according to claim 1, wherein said press-bonding and heat melting step is carried out by applying pressure and heat by using a hot plate or a hot roller.

3. The method according to claim 1, wherein said press-bonding and heat-melting step is carried out by inserting said base covered with said fabric body into a heat-resistant hollow rubber body and heat-pressing the external surface of said hollow body.

4. The method according to claim 1, further comprising providing a coating layer on the surface of said adhered decorative fabric body, said coating layer being selected from a clear coating or a transparent film.

5. A method according to claim 1, wherein
said press-bonding and heat melting step is carried out by applying pressure and heat with a heated member.

6. A method according to claim 1, wherein
said step of applying a hot-melt adhesive on the surface of a rod base comprises applying a hot-melt adhesive on the surface of a rod base which is formed of a material which is substantially unsusceptible to change upon heating.

7. A method according to claim 6, wherein
said press bonding and heat melting step is carried out by applying pressure and heat with a heated member.

8. A method according to claim 6, wherein
said material of said rod base comprises one of the group consisting of metal and ceramic.

9. A method of producing a decorative article, comprising the steps of inserting a rod base made of a thermoplastic resin into a seamless cylindrical decorative fabric body, heat-pressing the outer surface of said fabric body to melt the surface of said base by applying pressure and heat against the outer surface of said fabric body, thereby adhering said decorative fabric body onto said base with the formed melt, and providing a coating layer on the surface of said adhered decorative fabric body, said coating layer being selected from a clear coating or transparent film.

10. The method according to claim 9, wherein said heat-pressing step is carried out by applying pressure and heat by using a hot plate or a hot roller.

11. The method according to claim 9, wherein said heat-pressing step is carried out by inserting said base covered with said fabric body into a heat-resistant hollow rubber body and heat-pressing the external surface of said hollow body.

12. A method according to claim 9, wherein
said heat-pressing step is carried out by applying pressure and heat with a heated member.

13. A method according to claim 9, wherein
said thermoplastic resin comprises at least one of the group consisting of an acrylonitrile-butadiene-styrene copolymer, an acrylonitrile-styrene copolymer, polypropylene, polyethylene, polycarbonate, polyvinyl chloride, nylon, polybutyl terephthalate, urethane, acrylic and polyethyline terephthalate.

14. A method of producing a decorative article, comprising the steps of applying a hot-melt adhesive onto the surface of a rod base, inserting said base into a seamless heat-shrinkable decorative fabric body, shrinking said fabric body while heat-melting said adhesive by applying heat to said fabric body, thereby adhering said decorative fabric body onto said base, and providing a coating layer on the surface of said adhered decorative fabric body, said coating layer being selected from a clear coating or a transparent film.

* * * * *